United States Patent [19]
Evans et al.
[11] Patent Number: 4,818,424
[45] Date of Patent: Apr. 4, 1989

[54] SPRAY DRYING OF A DETERGENT CONTAINING A PORUS CRYSTAL-GROWTH-MODIFIED CARBONATE

[75] Inventors: Elfed H. Evans, Clwyd; Peter C. Knight, South Wirral, both of United Kingdom

[73] Assignee: Lever Brothers Company, New York, N.Y.

[21] Appl. No.: 187,759

[22] Filed: Apr. 29, 1988

[30] Foreign Application Priority Data

Apr. 30, 1987 [GB] United Kingdom ................ 8710290

[51] Int. Cl.[4] ........................ B01D 1/18; C11D 7/12; C11D 11/02; C11D 17/06

[52] U.S. Cl. .................................... 252/91; 159/4.04; 159/4.06; 159/4.08; 159/48.1; 252/89.1; 252/135; 252/174; 252/174.13; 252/174.14; 252/174.19; 252/174.21; 252/174.24; 252/DIG. 1; 427/220

[58] Field of Search .................... 159/4.04, 4.06, 4.08, 159/48.1; 252/89.1, 91, 135, 174, 174.13, 174.14, 174.19, 174.21, 174.24, DIG. 1; 427/220

[56] References Cited

U.S. PATENT DOCUMENTS

| | | | |
|---|---|---|---|
| 3,121,639 | 2/1964 | Bauer | 159/4.08 |
| 3,629,955 | 12/1971 | Davis | 34/174 |
| 3,920,586 | 11/1975 | Bonaparte | 252/531 |
| 4,092,261 | 5/1978 | Sperling | 252/131 |
| 4,129,511 | 12/1978 | Ogoshi et al. | 252/140 |
| 4,261,793 | 4/1981 | Nakamura | 252/536 |
| 4,274,974 | 6/1981 | Kerkhoven | 252/90 |
| 4,549,978 | 10/1985 | Evans et al. | 252/109 |

FOREIGN PATENT DOCUMENTS

| | | | |
|---|---|---|---|
| 2095274A | 9/1982 | United Kingdom | 252/140 |

*Primary Examiner*—Dennis Albrecht
*Attorney, Agent, or Firm*—Milton L. Honig; James J. Farrell

[57] ABSTRACT

Granular spray-dried detergent compositions including a liquid component unsuitable for spray-drying are prepared by co-spray-drying a slurry of a porous crystal-growth-modified carbonate-based carrier salt and a detergent slurry containing detergent-active compounds, builders and other suitable ingredients, and then treating the resulting composite powder with the liquid component. The porous carrier salt is preferably the sodium carbonate/sodium sulphate double salt Burkeite, crystal-growth-modified by means of a polymeric polycarboxylate.

8 Claims, 2 Drawing Sheets

SPRAY DRYING OF A DETERGENT CONTAINING A PORUS CRYSTAL-GROWTH-MODIFIED CARBONATE

TECHNICAL FIELD OF INVENTION

The present invention relates to a process for the preparation of granular detergent compositions containing a porous crystal-growth-modified carbonate salt, as described and claimed in EP No. 221 776A (Unilever), as a carrier for liquid detergent components.

BACKGROUND AND INTRODUCTION

EP No. 221 776A (Unilever), published on May 13, 1987, describes and claims novel porous materials suitable for carrying liquid components in detergent compositions. One such material, crystal-growth-modified Burkeite, is prepared by drying (preferably spray-drying) a slurry containing sodium carbonate and sodium sulphate in an appropriate ratio and a crystal growth modifier, added to the slurry not later than the sodium carbonate so as to influence the growth of crystals of the double salt Burkeite. Crystal-growth-modified Burkeite is characterised by a high capacity for taking up liquid detergent components and one possible way in which it may be used in detergent compositions is as a base or carrier for nonionic surfactant in an "adjunct" which is postdosed to a spray-dried base powder. The adjunct is prepared by spraying liquid or liquefied nonionic surfactant onto the modified Burkeite carrier material, and is then postdosed to a spray-dried base powder containing anionic surfactant, possibly nonionic surfactant, phosphate and/or non-phosphate builder, sodium silicate, fluorescer and other non-heat-sensitive ingredients: this procedure is especially beneficial as a method for incorporating in powders those nonionic surfactants that are unsuitable for spray-drying because of unacceptable tower emission ("pluming" or "blue smoke"). The adjunct may, for example, contain from 5 to 40% by weight of nonionic surfactant, and may itself constitute, for example, from 5 to 20% by weight of the final detergent powder.

Phosphate-built and zero-phosphate powders containing such adjuncts are described in the aforementioned European specification in Examples 24 and 25: in comparison with similar powders where the nonionic surfactant was incorporated via the slurry, both powders exhibited substantially improved physical properties. To prepare these powders, however, two separate spray-drying operations—of the Burkeite carrier, and of the base powder—are necessary. This can cause difficulties in factories having only one spray-drying tower, and may necessitate storage of the Burkeite carrier material on site for prolonged periods and/or transport of this material between different factory sites.

It has now been discovered that powders of comparable properties can be prepared in a single spray-drying tower by spraying in separate slurries of powder and crystal-growth-modified Burkeite to form a composite product, and subsequently spraying liquid nonionic surfactant onto the composite product. The process can be used also for other porous carbonate-based carrier salts and other liquid detergent components.

PRIOR ART

Processes in which two different slurries are sprayed into a spray-drying tower are known in the art. EP No. 139 539A (Unilever) discloses a process in which a first slurry containing heat-stable components is spray-dried in a conventional manner from a position near the top of the tower, while a second slurry containing heat-sensitive components, such as soap or nonionic surfactant, is sprayed in at a lower level. U.S. Pat. No. 4,129,511 (Ogoshi et al/Lion) describes a process for preparing detergent powders containing aluminosilicate builders, in which process a detergent slurry and an aluminosilicate slurry are subjected simultaneously to spray-drying within the same drying space. Our copending European patent application No. 87 308239.0 filed on Sept. 17, 1987 describes and claims a process in which a detergent slurry and an aqueous solution of alkali metal silicate are sprayed simultaneously into a spray-drying tower so as to form composite granules.

DEFINITION OF THE INVENTION

The present invention provides a process for the preparation of a granular detergent composition, which comprises the steps of:

(i) preparing a first aqueous slurry comprising sodium carbonate, optionally together with sodium sulphate and/or sodium bicarbonate, and an effective amount of a crystal growth modifier which is an organic material having at least three carboxyl groups in the molecular, the crystal growth modifier being incorporated in the slurry not later than the sodium carbonate;

(ii) simultaneously spray-drying the first aqueous slurry and a second aqueous slurry comprising one or more anionic and/or nonionic surfactants, one or more detergency builders and optionally one or more further heat-insensitive detergent components, to form a powder including a crystal-growth-modified carbonate-based carrier salt;

(iii) treating the powder obtained from step (ii) with a liquid detergent component.

For convenience, the first slurry will be referred to hereinafter as the carbonate slurry, and the second slurry as the base powder slurry.

DESCRIPTION OF THE INVENTION

The present invention is directed to a preferred method for preparing detergent powders which contain a liquid detergent component adsorbed on a porous carbonate-based crystal-growth-modified carrier salt, as described and claimed in the aforementioned EP No. 221 776A (Unilever).

Three different porous carbonate-based crystal-growth-modified salts are of especial interest: sodium carbonate itself, mainly in monohydrate form but containing some anhydrous material; sodium sesquicarbonate, which is a hydrated carbonate/bicarbonate double salt of the formula $$Na_2CO_3.NaHCO_3.2H_2O;$$

and Burkeite, an anhydrous carbonate/sulphate double salt of the formula $$2Na_2SO_4.Na_2CO_3.$$

All three salts exhibit crystal growth modification, when prepared by drying a slurry containing the appropriate salt(s) and a crystal growth modifier added to the slurry not later than the sodium carbonate. The crystal growth modified materials are characterised by small needle-like crystals interspersed with very small pores, and are very useful as carriers of liquid detergent components.

The sodium carbonate/sodium sulphate double salt Burkeite represents an especially preferred embodiment of the invention. This material forms small crystals (about 10 μm) but in the normal block-like crystal form these are packed together in dense aggregates and the material has a low absorptivity for liquids. As explained in the aforementioned EP No. 221 776A (Unilever), Burkeite can be converted to a more desirable needle-shaped crystal form in the slurry by the addition of a low level of a polycarboxylate material at a particular stage in the slurry-making process. Crystal-growth-modified spray-dried Burkeite contains small needle-shaped crystals similar to those of sodium tripolyphosphate hexahydrate, and can be shown by mercury porosimetry to be interspersed to a large extent with very small (<3.5 μm) pores. These powders are capable of absorbing and retaining substantial quantities of liquid nonionic surfactants and other organic detergent components as a direct result both of a change in crystal form and of a less dense form of crystal packing, giving particles of greater porosity than those produced in the absence of a crystal growth modifier. The modified crystal structure can be recognised by optical or electron microscopy.

Instead of preparing a separate adjunct by treating the crystal-growth-modified carrier salt with nonionic surfactant or other liquid detergent component and then postdosing that adjunct to a spray-dried base powder, in accordance with the invention the two slurries are simultaneously sprayed into a spray-drying tower to prepare a composite material containing both crystal-growth-modified carrier salt and base powder, and that composite material is then treated with the liquid detergent component.

Although the simultaneous drying of two slurries in the same tower is known per se, as indicated above under "Prior Art", this procedure would not have been expected to be effective in the context of the present invention because of the low absorptivity of base powder for liquid detergent components, especially nonionic surfactant. Typically a spray-dried base power containing anionic surfactant, sodium tripolyphosphate builder and minor ingredients will not take up more than about 2% by weight of nonionic surfactant, while a porous carbonate-based carrier salt will take up 20% by weight or more. When a liquid nonionic surfactant is sprayed onto a composite material prepared in accordance with the invention, consisting for example of 15–20% by weight of carrier salt and 80–85% by weight of base powder, the probability of nonionic surfactant droplets encountering base powder rather than carrier salt is high and a rather poor uptake of nonionic surfactant would be expected, because the absorptivity of the carrier salt would not be utilised to its fullest extent. Surprisingly, however, the absorptivity of the composite material is considerably better than expected and, for example, a mixture having the typical proportions given above will take up about 5% by weight of nonionic surfactant without problems, indicating that the carrier salt is in fact operating virtually at full efficiency. It might also be expected that spraying of these relatively high levels of nonionic surfactant onto the composite mixture would give a sticky, poorly flowing product, but this has not been observed.

When the carrier salt is Burkeite, which is anhydrous, further problems might be expected because the two slurries have to be spray-dried to very different powder moisture contents: the base powder will normally contain about 10 to 18% by weight of water, while Burkeite carrier material does not contain more than about 2% by weight of water. The major part of the water in the base powder, however, is present in bound form in builder salts—notably sodium tripolyphosphate hexahydrate or sodium aluminosilicate—and the free moisture content is comparable to that of the Burkeite carrier material. Consequently, no problems have been experienced in this regard.

THE CARBONATE SLURRY

The carbonate slurry contains, as essential ingredients, sodiu carbonate, water and a polycarboxylate crystal growth modifier. Optionally sodium sulphate and/or sodium bicarbonate may be present depending on the porous carrier salt desired. Minor amounts of other materials may also be included as explained below.

It is essential that the polycarboxylate crystal growth modifier be present in the slurry at a sufficiently early stage to influence the crystal growth of the carbonate carrier salt. It must accordingly be incorporated in the slurry not later than the time at which the sodium carbonate is added. If sodium sulphate and/or sodium bicarbonate is or are present, the crystal growth modifier is preferably incorporated not later than the addition of both the sodium carbonate and the other salt(s).

In batch slurry-making, there is no difficulty in arranging for the ingredients to be added in the appropriate order. In continuous slurry-making processes all components are added substantially simultaneously, but once the start-up period is over the inorganic salts will in practice always encounter a slurry containing some crystal growth modifier.

The water used to prepare the carbonate slurry is preferably relatively soft. Desirably water of hardness not exceeding 15° (French) is used.

The sodium carbonate used in the carbonate slurry may be of any type. Synthetic light soda ash has been found to be especially preferred; natural heavy soda ash is intermediate, while synthetic granula soda ash is the least preferred raw material. All grades of sodium sulphate are suitable for use in the invention, provided that they are not heavily contaminated with other salts such as salts of calcium or magnesium.

If the carrier salt is Burkeite, the extent of its formation in the slurry will of course depend on the ratio of sodium carbonate and sodium sulphate present. This must be at least 0.03:1 (by weight) in order for the resulting spray-dried material to have a useful level of porosity; and it is preferably at least 0.1:1 and more preferably at least 0.37:1, this latter figure representing the stoichiometric ratio for Burkeite formation. Thus it is preferred that as much as possible of the sodium sulphate present be in the form of Burkeite. Any excess sodium carbonate present will itself be in a crystal-growth-modified form.

The stoichiometric weight ratio for sodium sesquicarbonate formation (sodium carbonate: sodium bicarbonate) is 1.26:1. During spray-drying some dehydration of sesquicarbonate occurs, to produce bicarbonate and carbonate; and some decomposition of bicarbonate to carbonate occurs. Furthermore, crystallisation in the slurry may not always be complete, so the yield of sesquicarbonate may be as low as 50% of theoretical. Preferably the weight ratio of sodium carbonate to sodium bicarbonate used in preparing a sesquicarbonate slurry is within the range of from 1.5:1 to 1:1.

The preferred order of addition of the salts to a Burkeite slurry is for sodium sulphate to be added before sodium carbonate. This has been found to give a higher yield of Burkeite and the Burkeite thus formed appears to have a higher useful porosity. In this preferred method, the crystal growth modifier should be added to the slurry either before the addition of both salts, or after the addition of the sodium sulphate ad before the addition of the sodium carbonate.

Similar considerations apply to the use of crystal-growth-modified sodium sesquicarbonate.

The polycarboxylate crystal growth modifier is an organic material containing at least three carboxyl groups in the molecule but we have found that it cannot be generically defined further in purely structural terms; it is also difficult to pedict how much will be required. It can, however, be defined functionally with reference to Burkeite crystal growth modification, as an organic material having three or more carboxyl groups in the molecule, which, when incorporated at a suitable level in a slurry to which sodium carbonate and sodium sulphate in a weight ratio of at least 0.3:1 are subsequently or simultaneously added, gives on a drying powder having a pore size distribution, as measured by mercury porosimetry, of at least 300 $cm^3$ of pores $<3.5$ $\mu m$ per kg of powder.

This porosity figure, measured by the recognised technique of mercury porosimetry, has been found to correlate well with the capacity to take up and retain liquid detergentt components such as nonionic surfactants.

For the purposes of selecting a crystal growth modifier on the basis of pore size distribution, it is necessary to use a simple slurry containing only sodium sulphate, sodium carbonate, the crystal growth modifier and water, because the presence of other materials will influence the porosity. This model system can then be used to select a crystal growth modifier for use in more complex slurries where other materials may be present, and/or for use in modifying the crystal growth of other carbonate salts, for example, sodium carbonate itself or sodium sesquicarbonate.

As hinted above, the carbonate slurry for use in the process of the present invention may advantageously contain minor amounts of other components. A small amount of anionic surfactant, for example, increases powder porosity and increases slurry stability; a small amount of nonionic surfactant improves slurry pumpability and atomisation; and sodium silicate reduces the friability of the carrier material and aids in handling.

The crystal growth modifier is a polycarbonate. Monomeric polycarboxylates, for example, salts of ethylenediaminetetraacetic acid, nitrilotriacetic acid and citric acid, may be used but the levels required are rather high, for example, 5 to 10% by weight based on the total amount of sodium carbonate and, if present, sodium sulphate and/or sodium bicarbonate. Preferred polycarboxylate crystal growth modifiers used in the invention are polymeric polycarboxylates. Amounts of from 0.1 to 20% by weight, preferably from 0.2 to 5% by weight, based on the total amount of sodium carbonate and, if present, sodium sulphate and/or sodium bicarbonate, are generally sufficient.

The polycarboxylate crystal growth modifier preferably has a molculer weight of at least 1000, advantageously from 1000 to 300,000, especially from 1000 to 250,000. Powders having especially good dynamic flow rates may be prepared if the carbonate slurry incorporates polycarboxylate crystal growth modifiers having molecular weights in the 3000 to 100,000 range, especially 3500 to 70,000 and more especially 10,000 to 70,000. All molecular weights quoted herein are those provided by the manufacturers.

Preferred crystal growth modifiers are homopolymers and copolymers of acrylic acid or maleic acid. Of especial interest are polyacrylates, acrylic acid/maleic acid copolymers, and acrylic phosphinates.

Suitable polymers, which may be used alone or in combination, include the following:

salts of polyacrylic acid such as sodium polyacrylate, for example Versicol (Trade Mark) E5, E7, and E9b ex Allied Colloids, average molecular weights 3500, 27,000 and 70,000; Narlex (Trade Mark) LD 30 and 34 ex National Adhesives and Resins Ltd, average molecular weights 5000 and 25,000 repsectively; Acrysol (Trade Mark) LMW-10, LMW-20, LMW-45 and A-IN ex Rohm & Haas, average molecular weights 1000, 2000, 4500 and 60,000; and Sokalan (Trade Mark) PAS ex BASF, average molecular weight 250,000;

ethylene/maleic acid copolymers, for example, the EMA (Trade Mark) series ex Monsanto;

methyl vinyl ether/maleic acid copolymers, for example, Gantrez (Trade Mark) AN119 ex GAF Corporation;

acrylic acid/maleic acid copolymers, for example, Sokalan (Trade Mark) CP5 and CP7 ex BASF; and acrylic phosphinates, for example, the DKW range ex National Adhesives and Resins Ltd or the Belsperse (Trade Mark) range ex Ciba-Geigy AG, as disclosed in EP No. 182 421 A (Unilever).

Mixtures of any two or more crystal growth modifiers may if desired be used in the compositions of the invention.

The carbonate slurry will generally contain from 45 to 60% by weight of water.

Slurry-making conditions may be chosen to maximise the yield of modified crystals obtained. Sodium carbonate and Burkeite slurries are best prepared at relatively high temperatures, preferably above 80° C., more preferably from 85° to 95° C.; while a sodium sesquicarbonate slurry is best prepared at a temperature not exceeding 65° C., preferably from 50° to 60° C., in order to minimise decomposition of the sodium bicarbonate present.

On drying a slurry containing crystal-growth-modified Burkeite, which is an anhydrous material, the double salt survives unchanged in the dried powder. Crystal-growth-modified sodium carbonate monohydrate and sodium sesquicarbonate will generally lose some water of crystallisation on drying, depending on the drying conditions, but this does not adversely affect the porosity and indeed may introduce further useful porosity.

THE BASE POWDER SLURRY

The base powder slurry will generally contain all ingredients desired in the final product that are sufficiently heat-stable to undergo spray-drying. It will always contain one or more anionic and/or nonionic surfactants and one or mlore detergency builders.

Anionic surfactants are well known to those skilled in the detergents art. Examples include alkylbenzene sulphonates, particularly sodium linear $C_8$–$C_{15}$ alkylbenzene sulphonates having an average chain length of $C_{11}$–$C_{13}$; primary and secondary alcohol sulphates,particularly sodium $C_{12}$–$C_{15}$ primary alcohol sulphates; olefin sulphonates; alkane sulphonates; and fatty acid ester sulphonates.

It may also be desirable to include one or more soaps of fatty acids. The soaps which can be used are preferably sodium soaps derived from naturally occurring fatty acids, for example the fatty acids from coconut oil, beef tallow, sunflower or hardened rapeseed oil.

The base powder slurry may also include one or more nonionic surfactants, in addition to the nonionic surfactant to be sprayed on in step (iii) of the process of the invention. Nonionic surfactants included in the base powder slurry will be of a type that does not give rise to unacceptable levels of tower emission, and will generally be present only at relatively low levels.

Examples of suitable nonionic surfactants are the primary and secondary alcohol ethoxylates, especially the $C_{12}$–$C_{15}$ primary and secondary alcohols ethoxylated with an average of from 5 to 20 moles of ethylene oxide per mole of alcohol.

The sodium carbonate present in the carbonate-based carrier salt acts as a detergency builder, but will not generally be present in a sufficient amount to provide adequate building. Preferred builders for inclusion in the base powder slurry include phosphates, for example, orthophosphates, pyrophosphates and (most preferably) tripolyphosphates. Non-P builders that may be present include, but are not restricted to, sodium carbonate, crystalline and amorphous aluminosilicates, soaps, sulphonated fatty acid salts, citrates, nitrilotriacetates and carboxymethyloxsuccinates. Polymeric builders, for example, polycarboxylates such as polyacrylates, acrylic/maleic copolymers and acrylic phosphinates, may also be present, generally but not exclusively to supplement the effect of another builder such as sodium tripolyphosphate or sodium aluminosilicate. The polymers listed previously as crystal rowth modifiers generally have builder efficacy and any of these may with advantage also be included in the base powder slurry.

Other ingredients that may be present in the base powder slurry include alkali metal silicates, antideposition agents, antiincrustation agents and fluorescers.

The water content of the base powder slurry will typically be in the range of from 30 to 55% by weight, preferably from 35 to 50% by weight. In the process of the invention the slurry will be dried to a total moisture content, for example, of from 10 to 18% by weight, but the free moisture content will be much smaller, and of a similar order of magnitude to that of the carbonate-based carrier salt.

SPRAY-DRYING PROCESS CONDITIONS

In the process of the invention, the carbonate slurry and the base powder slurry are sprayed simultaneously into the same spray-drying tower. The relative quantities of the two slurries sprayed in may easily be chosen so that the final product contains the solid ingredients in the desired ratio: a carbonate-based carrier salt content in the composite spray-dried powder of from 5 to 30% by weight, preferably from 10 to 25% by weight, is suitable having regard for the amount of liquid detergent component to be incorporated subsequently.

The base powder slurry is preferably spray-dried countercurrently in a conventional manner: the slurry is sprayed downwardly from a position ranging from around mid-height to the top of the tower, while hot air is blown upwardly into the tower from a position at or near the bottom. If desired, the slurry may be spray-dried concurrently, that is to say, with the slurry spray and the hot air entering the the tower together and flowing downwards, but that drying mode is less favoured because it is thermally less efficient and also tends to produce a less dense and finer powder. The slurry may also be dried using a combination of concurrent and countercurrent modes: any desired airflow pattern may be used.

The position at which the carbonate slurry is sprayed in, and the spray direction, are not critical. In a tower operating in the preferred countercurrent mode mentioned above, the carbonate slurry may be sprayed in from a level higher, lower or the same as the level from which the base powder slurry is sprayed in. In general, a relatively high spray-in position for the carbonate slurry is preferred in order to ensure adequate drying: preferably the carbonate slurry is sprayed in from a position not more than 2 m below the level at which the base powder slurry is sprayed in. If the level of spray-in of the carbonate slurry is the same as or lower than that of the base powder slurry, the carbonate slurry may advantageously be sprayed upwardly, and this is strongly preferred when the Burkeite slurry spray-in level is lower than the base powder slurry spray-in level. It is also within the scope of the invention for either or both slurries to be sprayed from more than one level.

Three specific spray-in arrangements have been investigated:

(a) spraying the carbonate slurry downwardly from a position at the same level as the spray-in of base powder slurry;
(b) spraying the carbonate slurry upwardly from a position near the bottom of the tower;
(c) spraying the carbonate slurry upwardly from a position 0.5–2 m below the level of spray-in of the base powder slurry.

Of the three arrangements, (a) and (c) were found to be better than (b).

The product of the co-spray-drying process, on examination by scanning electron microscopy, has been found to consist of intimately mixed agglomerates of base powder and crystal-growth-modified carbonate-based carrier salt.

TREATMENT WITH LIQUID DETERGENT COMPONENT

In the next stage of the process of the invention, the composite spray-dried powder is treated with a liquid detergent component. This term includes components that require liquefaction by melting or dissolving in a solvent, as well as materials liquid at room temperature. The liquid component is preferably applied to the composite granules by spraying while the granules are agitated in apparatus, for example, a rotating drum, that continually provides a changing surface of powder to the sprayed liquid. The spray nozzle is advantageously angled so that liquid that penetrates the powder curtain falls on further powder rather than the shell of the drum itself.

During the spraying process the temperature of the powder may range, for example, from 30° to 95° C. The powder generally leaves the spray-drying tower at an elevated temperature, and this may be advantageous when the component to be sprayed on has to be melted.

The amount of liquid detergent component to be sprayed on will depend on the content of carbonate-based carrier salt in the composition; or alternatively it may be said that the amount of carbonate-based carrier salt included in the spray-dried powder is chosen to accommodate the desired amount of liquid detergent component(s) in the final composition.

Preferably the amount of liquid detergent component is from 5 to 40% by weight based on the total of liquid detergent component and carbonate-based carrier salt: this is approximately equivalent to a range of 5 to 67% by weight based on the carbonate-based carrier salt alone.

The liquid detergent component may be any ingredient that may advantageously be carried on a porous carbonate-based carrier salt: the term "detergent component" does not imply surface activity. However, in a preferred embodiment of the invention this component is a nonionic surfactant.

Nonionic surfactants preferably used in the process and compositions of the invention are the primary and secondary alcohol ethoxylates, especially the $C_{12}$–$C_{15}$ primary and second alcohols ethoxylated with an average of from 3 to 20 moles of ethylene oxide per mole of alcohol. The use of crystal-growth-modified carbonate-based carrier material is especially advantageous for nonionic surfactants having an average degree of ethoxylation of 10 or below, which are generally liquid at room temperature and often cannot be spray-dried because they give rise to unacceptable levels of tower emission ("blue smoke" or "pluming").

OTHER POST-TREATMENTS

It will generally be desirable to add to the powder obtained from the nonionic spray-on stage (iii) various further ingredients, both liquid and solid, that are not suitable for spray-drying or that interfere with the spray-drying process. Examples of such ingredients are enzymes; bleaches, bleach precursors, or bleach activators; inorganic salts such as sodium sulphate, as described and claimed in EP No. 219 328A (Unilever); or sodium silicate as described and claimed in our copending Application Nos. 86 08291 filed on Apr. 4, 1986 and 86 09042 and 86 09043 filed on Apr. 14, 1986; lather suppressors; perfumes; dyes; and coloured noodles or speckles. Further examples of ingredients best incorporated by postdosing will readily suggest themselves to the skilled detergent formulator.

PRODUCTS OF THE INVENTION

Phosphate-built powders prepared in accordance with the invention may typically contain the following amounts of the following ingredients:

| | weight % |
|---|---|
| Surfactants (anionic, nonionic, cationic, zwitterionic) | 5–40 |
| Sodium tripolyphosphate | 5–40 |
| Sodium carbonate (in carrier salt) | 1–10 |
| Sodium carbonate (other) | 0–10 |
| Sodium sulphate or sodium bicarbonate (in carrier salt) | 0–25 |
| Sodium sulphate (other) | 0–30 |
| Crystal growth modifier (polymeric polycarboxylate) | 0.05–5 |
| Sodium silicate | 0–15 |
| Bleach ingredients | 0–30 |
| Enzyme, lather suppressor etc | 0–10 |

Low or zero-phosphate aluminosilicate-built powders prepared in accordance with the invention may typically contain the following amounts of the following ingredients:

| | weight % |
|---|---|
| Surfactants (anionic, nonionic, cationic, zwitterionic) | 5–40 |
| Sodium aluminosilicate | 10–60 |
| Sodium tripolyphosphate | 0–25 |
| Sodium orthophosphate | 0–20 |
| Sodium nitrilotriacetate | 0–20 |
| Sodium carbonate (in carrier salt) | 1–10 |
| Sodium carbonate (other) | 0–10 |
| Sodium sulphate or sodium bicarbonate (in carrier salt) | 0–25 |
| Sodium sulphate (other) | 0–30 |
| Crystal growth modifier (polymeric polycarboxylate) | 0.05–10 |
| Sodium silicate | 0–10 |
| Bleach ingredients | 0–30 |
| Enzyme, lather suppressor etc | 0–10 |

DESCRIPTION OF DRAWINGS

The process of the invention will now be described in more detail, by way of example only, with reference to the accompanying drawings, in which:

Referring now to FIG. 1 of the accompanying drawings, a spray-drying tower indicated generally by the reference numeral 1 contains near its top a first set of spray nozzles 2 fed by a line 3. The nozzles 2 point downwards. A second set of spray nozzles 4, pointing upwards, are positioned a substantial distance, for example, 4.4 m, below the first set 2. The nozzles 4 are fed by a line 5. A ring main 6 for hot air is positioned near the base of the tower.

Figure 1:
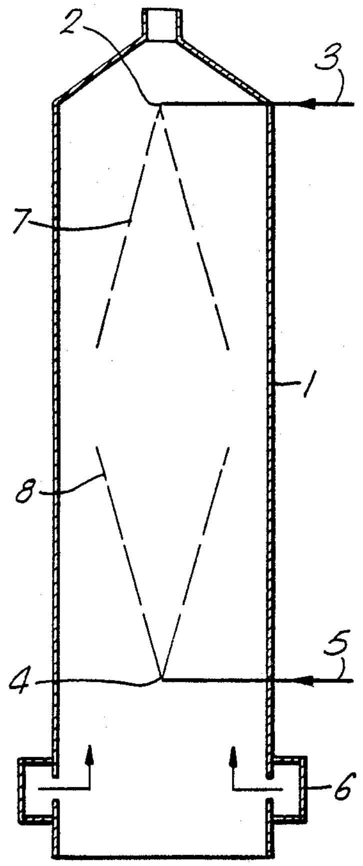
FIG. 1 represents a schematic vertical section of a first spray-drying tower adapted for use in accordance with the invention.

The process of the invention is carried out as follows. An aqueous slurry containing the base powder ingredients is pumped along the line 3 to the nozzles 2 where it is sprayed downwards, the atomised droplets forming a hollow cone indicated by the dotted line 7. An aqueous carbonate slurry is pumped along the line 5 to the nozzles 4 where it is sprayed upwards, the atomised droplets forming a hollow cone indicated by the dotted line 8. Droplets and partially dried sticky particles from the two sets of nozzles 2 and 4 can collide to form composite granules which fall to the base of the tower, together with base powder granules and carbonate-based carrier salt granules formed by the drying of those droplets that fail to collide. The granules collected at the base of the tower may form agglomerates while they are still relatively sticky.

Figure 2:
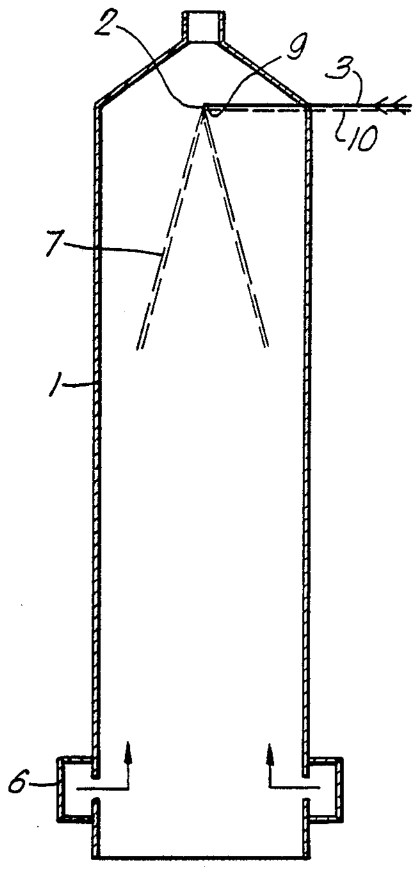
FIG. 2 represents a schematic vertical section of a second spray-drying tower adapted for use in accordance with the invention.

A variant of this process may be carried out using the tower shown in FIG. 2 of the accompanying drawings. Like the tower of FIG. 1, this has spray nozzles 2 at the top of the tower for the base powder slurry. It differs from the tower of FIG. 1 in that a second set of nozzles 9, fed by a line 10, is provided at the same level as the first set of nozzles 2. Base powder slurry is sprayed through the nozzles 2 and carbonate slurry through the nozzles 9, and again the resulting granules are collected at the base of the tower. The use of a higher spray position for the carbonate slurry enables that slurry to be dried to a lower moisture content and has been found to give a better powder.

Figure 3:
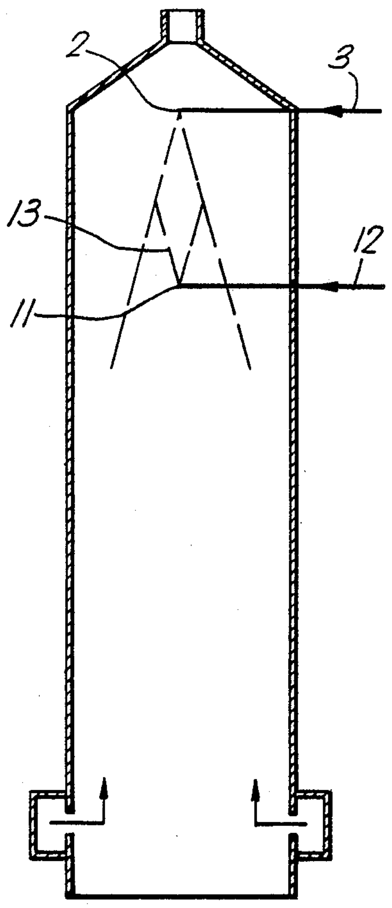
FIG. 3 represents a schematic vertical section of a third spray-drying tower adapted for use in accordance with the invention.

Yet another nozzle arrangement is shown in FIG. 3 of the accompanying drawings. The spray position for the base powder slurry is the same as in FIGS. 1 and 2, while the carbonate slurry is sprayed in upwardly through nozzles 11 positioned a relatively short distance, for example 1 m, below the nozzles 2, the atomised droplets forming a hollow cone denoted by the dotted line 13. The nozzles 11 are fed by a line 12. The arrangement shown in FIG. 3 allows the maximum number of collisions between droplets of the two slurries and is the most preferred of the three arrangements, giving powders having the best properties.

Powders prepared by the methods described above may subsequently be treated with one or more liquid detergent components as described previously.

EXAMPLES

The invention is illustrated by the following non-limiting Examples, in which parts and percentages are by weight unless otherwise stated.

Examples 1 to 5

A Burkeite slurry was prepared to the following composition:

| | parts |
|---|---|
| Sodium polyacrylate (molecular weight 25 000) | 2.0* |
| Sodium sulphate | 65.5 |
| Sodium carbonate | 24.5 |
| Nonionic surfactant | 1.0 |
| Sodium alkaline silicate | 4.5 |
| Softened water | 114.0 |
| | 211.5 |

*2.2% based on sodium sulphate + sodium carbonate. The sodium carbonate to sodium sulphate ratio was 0.37:1 (stoichiometric).

The order of addition of ingredients to the crutcher was as follows: water to 85° C., sodium polyacrylate (crystal growth modifier), sodium sulphate, sodium carbonate, sodium silicate, nonionic surfactant.

In another crutcher a base powder slurry was prepared to the following composition:

| | parts |
|---|---|
| Anionic surfactant (linear alkylbenzene sulphonate) | 9.0 |
| Nonionic surfactant | 1.0 |
| Sodium tripolyphosphate | 21.5 |
| Sodium alkaline silicate | 5.5 |
| Sodium polyacrylate (molecular weight 25 000) | 2.7 |
| Minor ingredients (fluorescer, antiredeposition agent etc) | 0.8 |
| Water | 40.0 |
| | 80.5 |

In a control experiment (Comparative Example A), a base powder slurry similar to that above but additionally containing 10.0 parts of sodium sulphate was spray-dried to a powder moisture content of 8.0 parts. In Examples 1 to 3, base powder slurry and Burkeite slurry were co-sprayed using the different nozzle arrangements described previously, as follows:

Example 1: arrangement of FIG. 1,
Example 2: arrangement of FIG. 2,
Example 3: arrangement of FIG. 3.

The Burkeite slurry was sprayed in an amount corresponding to 10 parts of Burkeite per 48.5 parts of base powder (40.5 parts solids, 8 parts moisture).

In each experiment the tower inlet temperature was 350° C. and the outlet temperature was 95°–105° C. The powders were spray-dried to a moisture content of 14–16%.

Each spray-dried product (58.5 parts) was then sprayed with 3 parts of liquid nonionic surfactant. The following ingredients were then postdosed:

| | parts |
|---|---|
| TAED granules | 4.6 |
| Sodium carbonate (heavy ash) | 4.0 |
| Sodium perborate tetrahydrate | 8.0 |
| Minor ingredients (enzyme, bleach stabilizer, lather suppressor etc) | 3.5 |
| Sodium sulphate | 18.4 |
| | 100.0 |

A second control powder B containing a postdosed nonionic surfactant/Burkeite adjunct was also prepared as follows. A base powder was prepared by spray-drying a base powder slurry as used in Examples 1, 2 and 3, and the same materials as in those Examples (TAED granules, sodium carbonate, sodium perborate, minor ingredients, sodium sulphate) were postdosed, plus 13.0 parts of an adjunct prepared by spray-drying a Burkeite slurry (as in Examples 1–3) to form 10.0 parts of Burkeite, and then spraying 3.0 parts of nonionic surfactant onto the Burkeite. The control powder B thus had exactly the same chemical composition as the final powders of Examples 1–3, but the nonionic surfactant was carried on an adjunct rather than sprayed on to the whole powder.

Some properties of the powders at various stages in the process are shown in the Table following Example 5, in which "BD" denotes bulk density (g/liter),
"DFR" denotes dynamic flow rate (ml/s).

Example 4

A sodium sesquicarbonate slurry was prepared to the following composition:

| | Parts |
|---|---|
| Sodium polyacrylate (molecular weight 25 000) | 2.0* |
| Sodium bicarbonate | 40.0 |
| Sodium carbonate | 40.0 |
| Nonionic surfactant | 1.0 |
| Sodium alkaline silicate | 4.5 |
| Softened water | 103.0 |
| | 190.5 |

*2.5% based on sodium bicarbonate + sodium carbonate.

The order of addition of ingredients to the crutcher was as follows: water to 60° C., sodium polyacrylate (crystal growth modifier), sodium bicarbonate, sodium carbonate, sodium silicate, nonionic surfactant.

In another crutcher a base powder slurry was prepared to the composition given in Examples 1–3.

Base powder slurry and sodium sesquicarbonate slurry were co-sprayed using the nozzle arrangement shown in FIG. 2, the sesquicarbonate slurry being sprayed in at an amount corresponding to 10 parts of sesquicarbonate per 48.5 parts of base powder (40.5 parts solids, 8 parts moisture). Spray-drying conditions were as in Examples 1-3.

The powder was sprayed with nonionic surfactant, and other ingredients were postdosed, as in Examples 1-3. Some properties of the powder at various stages in the process are shown in the Table following Example 5.

Example 5

A sodium carbonate slurry was prepared by mixing sodium carbonate (64 parts by weight) with an aqueous solution (64 parts by weight) made up of 62 parts of softened water and 2 parts (3.1% based on the sodium carbonate) of sodium polyacrylate (molecular weight 25,000).The temperature of the aqueous solution was 80° C.

The slurry was co-sprayed with a base powder slurry using the same compositions and conditions as in Example 4, with sodium carbonate substituted for sesquicarbonate. The powder was treated in the same way as in Example 4, and powder property data are shown in the Table.

EXAMPLE 1-5

| Example | Spray-dried powder | | Spray-dried powder + nonionic surfactant | | Final powder (fresh) | | Final powder (24 hours) | |
|---|---|---|---|---|---|---|---|---|
| | BD | DFR | BD | DFR | BD | DFR | BD | DFR |
| A | 430 | 90 | 435 | 80 | 570 | 80 | 574 | 86 |
| 1 | 456 | 109 | 440 | 83 | 594 | 109 | 599 | 104 |
| 2 | 402 | 114 | 414 | 80 | 588 | 114 | 600 | 110 |
| 3 | 494 | 100 | 514 | 100 | 644 | 92 | 646 | 100 |
| B | 400 | 114 | 440 | 114 | 620 | 110 | 630 | 110 |
| 4 | 440 | 100 | 455 | 95 | 580 | 105 | 590 | 110 |
| 5 | 457 | 105 | 470 | 100 | 605 | 110 | 630 | 110 |

Examples 6 & 7

The following Examples illustrate how base powders prepared by the process of the invention and containing co-sprayed polymer-modified Burkeite can take up higher levels of nonionic surfactant, without detriment to their flow properties, than can control base powders not containing co-sprayed Burkeite. In Comparative Examples A, C and D, liquid nonionic surfactant was sprayed, in the amount given in the Table (in parts), onto the comparative spray-dried base powder mentioned previously under Comparative Example A (58.5 parts, including 10.0 parts of sodium sulphate and 8.0 parts of moisture). In Examples 2, 6 and 7, the nonionic surfactant was sprayed onto the powder prepared as described previously under Example 2 (48.5 parts, including 10.0 parts co-sprayed polymer-modified Burkeite and 8.0 parts moisture). The results are shown in the Table and illustrate a substantial difference in flow after 24 hours' weathering.

| Example | Sprayed-on nonionic surfactant | Fresh powder | | Stored powder (24 hours) | |
|---|---|---|---|---|---|
| | | BD | DFR | BD | DFR |
| A | 3.0 | 435 | 80 | 440 | 85 |
| C | 4.0 | 430 | 75 | 445 | 80 |
| D | 5.0 | 400 | 50 | 430 | 65 |
| 2 | 3.0 | 414 | 80 | 420 | 110 |
| 6 | 4.0 | 420 | 80 | 424 | 100 |
| 7 | 5.0 | 390 | 60 | 430 | 90 |

We claim:

1. A process for the preparation of a granular detergent composition, which comprises the steps of:

(i) preparing a first aqueous slurry comprising sodium carbonate, optionally together with sodium sulphate and/or sodium bicarbonate, and a crystal growth modifier which is an organic material having at least three carboxyl groups in the molecule, the crystal growth modifier being incorporated in the slurry not later than the sodium carbonate and in an amount of from 0.1 to 20% by weight based on the total amount of crystal-growth-modified carbonate-based carrier salt;

(ii) simultaneously spray drying in the same spray drying tower the first aqueous slurry and a second aqueous slurry comprising one or more anionic and/or nonionic surfactants, one or more detergency builders and optionally one or more further heat-sensitive detergent components, to form a powder including a crystal-growth-modified carbonate-based carrier salt, said first and second aqueous slurry being present in an amount such that the spray-dried powder produced therefrom contains from 5 to 30% by weight of crystal-growth-modified carbonate-based carrier salt;

(iii) treating the powder obtained from step (ii) with a liquid detergent component in an amount within the range of from 5 to 67% by weight based on the carbonate-based carrier salt.

2. A process as claimed in claim 1, wherein the first aqueous slurry comprises sodium carbonate and sodium sulphate in a weight ratio of sodium carbonate to sodium sulphate of at least 0.03:1, whereby the powder obtained in step (ii) includes crystal-growth-modified Burkeite.

3. A process as claimed in claim 1, wherein the first aqueous slurry comprises sodium carbonate and sodium bicarbonate, whereby the powder obtained in step (ii) includes crystal-growth-modified sodium sesquicarbonate.

4. A process as claimed in claim 1, wherein the liquid detergent component used in step (iii) comprises a nonionic surfactant.

5. A process as claimed in claim 1, wherein the crystal growth modifier in the first aqueous slurry is a polymeric polycarboxylate having a molecular weight of from 1000 to 300,000, and is present in an amount of from 0.1 to 20% by weight based on the total amount of sodium carbonate, and (if present) sodium sulphate and/or sodium bicarbonate, in the said slurry.

6. A process as claimed in claim 1, wherein the second aqueous slurry is sprayed downwardly into a spray-drying tower, and the first aqueous slurry is sprayed in at a level not more than 2 m below the level at which the second aqueous slurry is sprayed in.

7. A process as claimed in claim 6, wherein both slurries are sprayed downwardly from substantially the same level.

8. A process as claimed in claim 6, wherein the first aqueous slurry is sprayed upwardly from a level 0.5 to 2.0 m below the level at which the second aqueous slurry is sprayed in.

* * * * *